US008690681B2

(12) United States Patent
Swarna

(10) Patent No.: US 8,690,681 B2
(45) Date of Patent: Apr. 8, 2014

(54) SYSTEM FOR CONFIGURATION VALIDATION

(75) Inventor: Rajesh Swarna, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1419 days.

(21) Appl. No.: 12/111,899

(22) Filed: Apr. 29, 2008

(65) Prior Publication Data

US 2008/0200258 A1 Aug. 21, 2008

(51) Int. Cl.
*A63F 13/00* (2006.01)

(52) U.S. Cl.
USPC .................... 463/42

(58) Field of Classification Search
USPC .................... 463/29, 42, 25
See application file for complete search history.

(56) References Cited

U.S. PATENT DOCUMENTS 6,884,173 B2 * 4/2005 Gauselmann .................. 463/42
6,939,234 B2 * 9/2005 Beatty .................. 463/42
2007/0032288 A1 * 2/2007 Nelson et al. .................. 463/16
2008/0076558 A1 * 3/2008 Okada .................. 463/36
2008/0102919 A1 * 5/2008 Rowe et al. .................. 463/18

* cited by examiner

*Primary Examiner* — Arthur O Hall
*Assistant Examiner* — Allen Chan
(74) *Attorney, Agent, or Firm* — Brooke Quist; Marvin Hein

(57) ABSTRACT

Various embodiments are directed to gaming systems and related methods for validating a download assignment or a validation assignment for one or more electronic gaming machines (EGMs). In one embodiment, the gaming system can schedule downloads and/or configurations for one or more EGMs from a network terminal. Additionally, the network terminal determines whether the download or selected configuration is compatible with the existing physical or software structure of an EGM. In the event the EGM configuration is not compatible with the scheduled download or configuration, a casino operator is notified of the error at the network terminal. Optionally, the gaming system automatically schedules one or more supplemental downloads so that the user-selected download or configuration is executable on the EGMs.

16 Claims, 6 Drawing Sheets

SYSTEM FOR CONFIGURATION VALIDATION

CROSS-REFERENCE TO RELATED APPLICATIONS

This application is a continuation-in-part of U.S. patent application Ser. No. 11/530,875 filed on Sep. 11, 2006 and U.S. patent application Ser. No. 11/530,880 filed on Sep. 11, 2006, both of which in turn claim priority to U.S. Provisional Application No. 60/716,713 filed on Sep. 12, 2005, all of which are hereby incorporated herein by reference.

This application is related to co-pending U.S. patent application Ser. No. 12/111,859 concurrently filed on Apr. 29, 2008, entitled METHOD FOR CONFIGURATION VALIDATION.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Over the years, casinos have grown in size, grandeur, and amenities in order to attract gambling patrons. Additionally, casinos have attempted to provide gambling patrons with a wide variety of the new and exciting games. Given this demand, gaming machines have grown in sophistication and features in order to captivate and maintain player interest. As a result, casinos are able to provide a wide range and large number of games of chance.

For example, a casino floor may include thousands of electronic gaming machines (EGMs) that are in communication with and monitored by the casino's gaming network. EGMs provide an enhanced gaming experience with computer graphics, stereo sound, animation, and other features that have been developed to maintain player interest in the game. Furthermore, EGMs may include secondary networked devices such as player tracking devices or enhanced player interfaces (e.g., Bally Gaming's iView™ touch-screen display). Accordingly, there are a large number of EGMs and related components that need to be monitored, maintained, and serviced.

In early gaming environments, gaming machines were stand-alone devices. Security of the gaming machines was accomplished via physical locks, security protocols, security personnel, physical and video monitoring, and the need to be physically present at a machine to attempt to breach the security of the gaming machine. By the same token, management of the gaming machines required a great deal of personal physical interaction with each gaming machine. The ability to change parameters of the gaming machine also required physical interaction.

In view of the increased processing power and availability of computing devices, gaming machines have become customizable via electronic communications and remote control. Manufacturers of gaming equipment have taken advantage of the increased functionality of gaming machines by adding additional features to gaming machines, thereby maintaining a player's attention at the gaming machines for longer periods of time, and increasing minimum bet and bet frequency and speed of play. This, in turn, leads to the player wagering at the gaming machine for longer periods of time, with more money at a faster pace, thereby increasing owner profits.

The amount of interactivity and data presentation/collection possible with current processor based gaming machines has led to a desire to connect gaming machines in a gaming network. In addition to the gaming machines themselves, a number of devices associated with a gaming machine or with a group of gaming machines may be part of the network. It has become important for the devices within a gaming machine or cabinet to be aware of each other and to be able to communicate to a control server. Not only is the presence or absence of a network device important, but also the physical location of the device and the ability to associate devices within a particular gaming machine has become a necessary component of a gaming network.

Currently, casino operators use manual methods to alter content or to reconfigure EGMs and/or other secondary networked devices. For example, a casino employee would need to physically swap out an EPROM to change game content or the employee would need to access an attendant menu on the EGM to alter game configurations. Given the large number of machines and networked devices, this process is a time-consuming and costly process not only in terms of operating and/or maintenance costs, but also in terms of lost profits due to extended downtime for the EGMs. Similarly, existing approaches for software updates or downloads for EGMs are labor-intensive and costly. For example, a technician typically needs to travel to the gaming machine in order to replace existing software package media (e.g., EPROMs, CD-ROM's, Compact Flash, etc.) with new software package media. Furthermore, the software package update process may require that the EGM be disabled hours in advance to prevent any players from using the EGM when the technician is ready to perform software package changes. Alternatively, EGMs may need to be disabled prior to software package updates, but the technician must periodically check to ensure that the EGM(s) are not being used by a player. Additionally, technicians may need to be supervised during the process of software package installation as the technician has access to critical areas of the EGM required for configuration or of those areas of containing cash.

The process of transferring packages to an EGM over a network may require a significant amount of network bandwidth during the transfer period. Typical transfer mechanisms provide point-to-point transfer where a software distribution point (SDP) will not transfer to a single EGM until the transfer is complete, and then the SDP may transfer to another EGM. When hundreds or thousands of EGM's require packages to be transferred there may be an unacceptable extended period of high bandwidth usage, since the transfers must occur sequentially.

Additionally, installing packages on an EGM can require verification that dependent software packages and hardware components are available within the EGM. This is typically a manual process that is prone to human interpretation and human error.

Accordingly, there remains a need to provide a system for updating and configuring EGMS and other networked components.

SUMMARY

Briefly, and in general terms, various embodiments are directed to gaming systems and related methods for validating a download assignment or a validation assignment for one or more electronic gaming machines (EGMs). In one embodiment, the gaming system can schedule downloads and/or configurations for one or more EGMs from a network terminal. Additionally, the network terminal determines whether the download or selected configuration is compatible with the existing physical or software structure of an EGM. In the event the EGM configuration is not compatible with the scheduled download or configuration, a casino operator is notified of the error at the network terminal. Optionally, the gaming system automatically schedules one or more supplemental downloads so that the user-selected download or configuration is executable on the EGMs.

Various methods for validating assignments for one or more electronic gaming machines are disclosed herein. According to one method, a first download assignment is prepared for an electronic gaming machine. The current configuration information is then obtained from the electronic gaming machine. A user is informed of potential errors if the first download assignment is executed on the electronic gaming machine where the potential errors include a scheduling conflict with a second download assignment, improper software on the electronic gaming machine, improper hardware on the electronic gaming machine, or any combination thereof.

According to another method, a download assignment is prepared for an electronic gaming machine. The current configuration information of the electronic gaming machine is also obtained. A determination is made as to whether a scheduling conflict exists between the download assignment and another assignment. Additionally, a determination is made as to whether a configuration download is scheduled after the download assignment. A determination is also made as to whether the download assignment would be applied to the electronic gaming machine when the download assignment is executed on the gaming machine. A user is informed of potential errors if the download assignment is executed on the electronic gaming machine.

Another method is directed to validating a configuration assignment. According to one method, a configuration assignment including one or more selectable configuration options for the electronic gaming machine is evaluated. A determination is made as to whether a scheduling conflict exists between the configuration assignment and a second assignment. An error message is presented when the selected options for the configuration assignment are not applicable to the electronic gaming machine. Otherwise, the configuration assignment is transmitted to one or more electronic gaming machines, and the electronic gaming machine is configured according to configuration options selected in the configuration assignment.

In another method, a configuration assignment is established at a network terminal. The configuration assignment includes one or more selectable configuration options for one or more electronic gaming machines. The configuration assignment is evaluated for the electronic gaming machines at the network terminal, and an error message is presented at the network terminal when the selected options for the configuration assignment are not applicable to one or more electronic gaming machines.

In addition to various methods for validating an assignment for one or more electronic gaming machines, various gaming systems are also disclosed herein. In one embodiment, the gaming system includes a configuration and validation system for establishing one or more assignments for one or more networked gaming machines. The gaming system also includes a plurality of electronic gaming machines in communication with the configuration and validation system where each of the electronic gaming machines being configurable for one or more selectable configuration options.

According to one embodiment, the gaming system includes a plurality of electronic gaming machines. Each of the electronic gaming machines is configurable for one or more selectable configuration options. The gaming system also includes a validation system in communication with the plurality of electronic gaming machines, and a network terminal in communication with the plurality of electronic gaming machines via the validation system. The network terminal is configured to schedule and validate download assignments and configuration assignments for the one or more electronic gaming machines.

Other features will become apparent from the following detailed description, taken in conjunction with the accompanying drawings, which illustrate by way of example, the features of the various embodiments.

DETAILED DESCRIPTION

Figure 1:
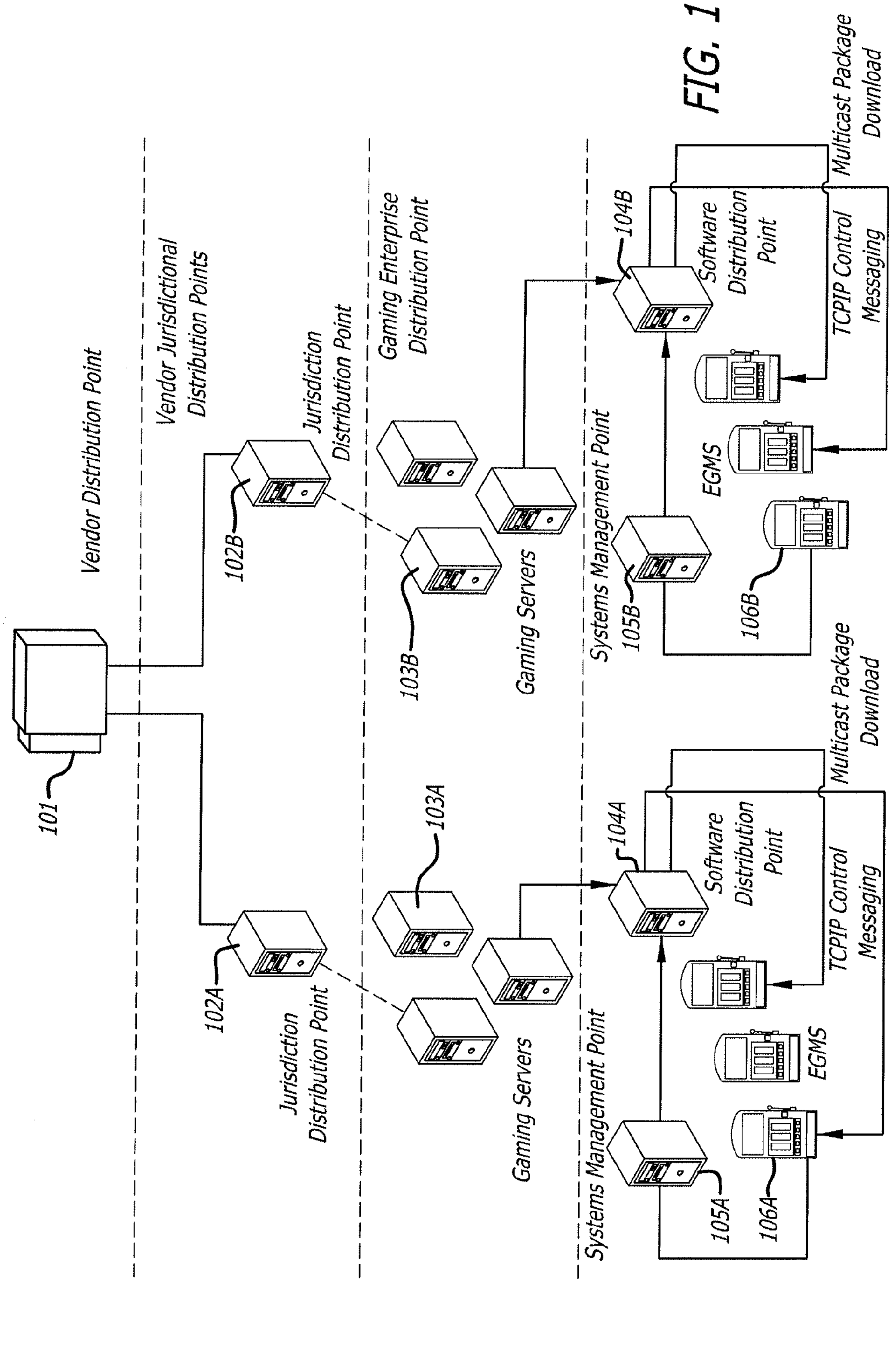
FIG. 1 illustrates an embodiment of a gaming network that may be used with the system.

Various embodiments are directed to gaming systems and related methods for validating a download assignment or a validation assignment for one or more electronic gaming machines (EGMs). In one embodiment, the gaming system configures an EGM from a remote terminal over network communications. At the remote terminal, a casino operator can download updates or fixes to existing programs or files on the EGM, update or change the operating system, or download new programs to the EGM. Additionally, the casino operator may configure one or more options on the EGM. Based upon the casino operator's selected download or configuration assignment, the gaming system validates the assignment for the EGMs and determines whether the EGM would successfully apply the changes when the assignment is executed. If the assignment would not be successfully applied, the casino operator is informed of any reasons that would cause the assignment to fail.

The configuration of an EGM can vary upon the EGM's installed software or physical structure (e.g., reels or video screen, types and number of buttons). Additionally, a wide variety of EGMs may be in communication with the gaming system. A casino operator may change the options and/or configuration of one EGM, a group of EGMs, or all the EGMs in communication with the gaming system. Given the large number of possible configurations for the EGMs that are managed by the casino operator at the remote terminal, the gaming system includes a mechanism to validate an assignment thereby reducing the number of conflicting configurations for the EGMs.

The gaming system also presents the various download and configuration assignment options to an operator at a remote terminal. The remote terminal will accept changes to the option settings from the operator. The changes to any of the options are validated in order to ensure that the selected changes will take effect on the EGMs.

According to one embodiment, the system performs one or more checks to evaluate whether the download assignment is executable (and operable) on the EGMs. For example, a validation check determines whether any download or installation assignments conflict with the scheduled download assignment. If there is a conflict, the system can reschedule one or more of the assignments to ensure that all assignments may be completed. The conflicting assignments may be rescheduled according to a first in first out approach. Alternatively, the conflicting assignments may be rescheduled according to a preset priority. For example, an operating system download would take priority over a download for changing the sound effect played for a jackpot.

Another validation check for a download assignment determines whether any conflicting configuration assignments are scheduled at the same time or within the time frame when the download assignment would be downloaded to the EGM. If a conflict is present, the gaming system may reschedule the download assignment or the configuration assignment.

Yet another validation check for a download assignment determines whether any configuration assignments are scheduled to run after the download and installation of a download assignment. If a configuration assignment is not scheduled, the casino operator is prompted to schedule a configuration assignment. Alternatively, a configuration assignment is automatically scheduled after the download assignment. In yet another embodiment, the casino operator is prompted to select one or more configuration assignments to make the EGM playable after the download assignment is completed.

In another embodiment, one or more validation checks are conducted for a configuration assignment. The validation checks determine whether the changes associated with the configuration assignment would be executed on the EGM. According to one validation check, the system determines whether the selected options and their associated values in the assignment apply to the selected EGMs. For example, a configuration selecting a "bet all paylines button" would not be applicable or usable on an EGM that presents a blackjack or poker game. Accordingly, an error message or prompt is provided at the network terminal to change the configuration assignment to exclude the blackjack or poker EGM.

Another validation check determines if there are any scheduling conflicts with any other configuration or download assignments. Similar to the validation check for download assignments, the configuration may be rescheduled to a time so that all the scheduled assignments can be completed. The configuration assignment may be rescheduled according to priority (e.g., high or low), first-in-first-out prioritization, last-in-first-out prioritization, or any other method of data prioritization.

Another validation check is based upon the type of configuration. Certain configuration assignments can only be executed after a download assignment is completed. For example, configuration assignments altering a game theme or a game definition should only be scheduled after a download assignment including the new game theme or new game is completed. Accordingly, the validation check ensures that the EGM is able to make the configuration changes set forth in the configuration assignment by determining if the EGM has the relevant programs or settings prior to executing a programmed configuration assignment.

Referring now to the drawings, wherein like reference numerals denote like or corresponding parts throughout the drawings and, more particularly to FIGS. 1-5, there are shown various embodiments of a system for validating a download or a gaming machine configuration for one or more EGMs. More specifically, FIG. 1 illustrates one embodiment of a gaming system 100. The system 100 uses a network configuration where one or more EGMs are networked with a configuration server point (CSP) network server and at least one CSP network access terminal. In one embodiment, supplemental remote terminals can be networked with the CSP network server to provide multiple workstations for EGM configuration verification and/or alteration. The network may be shared among other casino network systems or may be an exclusive network dedicated to configuration activities.

As shown in FIG. 1, the system 100 includes a top level vender distribution point 101 that contains all packages for all jurisdictions, one or more jurisdiction distribution points 102A and 102B that contain regulator approved production signed packages used within that jurisdiction or sub-jurisdiction, one or more Software Management Points 103A and 103B to schedule and control the downloading of packages to the EGM 106A and 106B and a one or more Software Distribution Points 104A and 104B that contain regulator approved production signed packages only used in the gaming establishment that it supports. The Software Distribution Points (SDPs) 104A and 104B can communicate with Systems Management Points (SMPs) 105A and 105B, respectively as well as directly to one or more EGMs 106A and 106B. The system 100 allows for rapid and secure distribution of new games, configurations, and operating systems from a centralized point. Existing gaming machines 6006A and 106B may be updated and modified with fixes and updates to programs as well as providing modifications to such files as screen images, video, sound, pay tables and other EGM control and support files. The system 100 provides complete control of gaming machines 6006A and 106B from a centralized control and distribution point and can minimize the need and delay of human intervention at the EGM. In one embodiment, the configuration control may be from the SDPs 101 or 104 or from the gaming servers 103.

Figure 2:
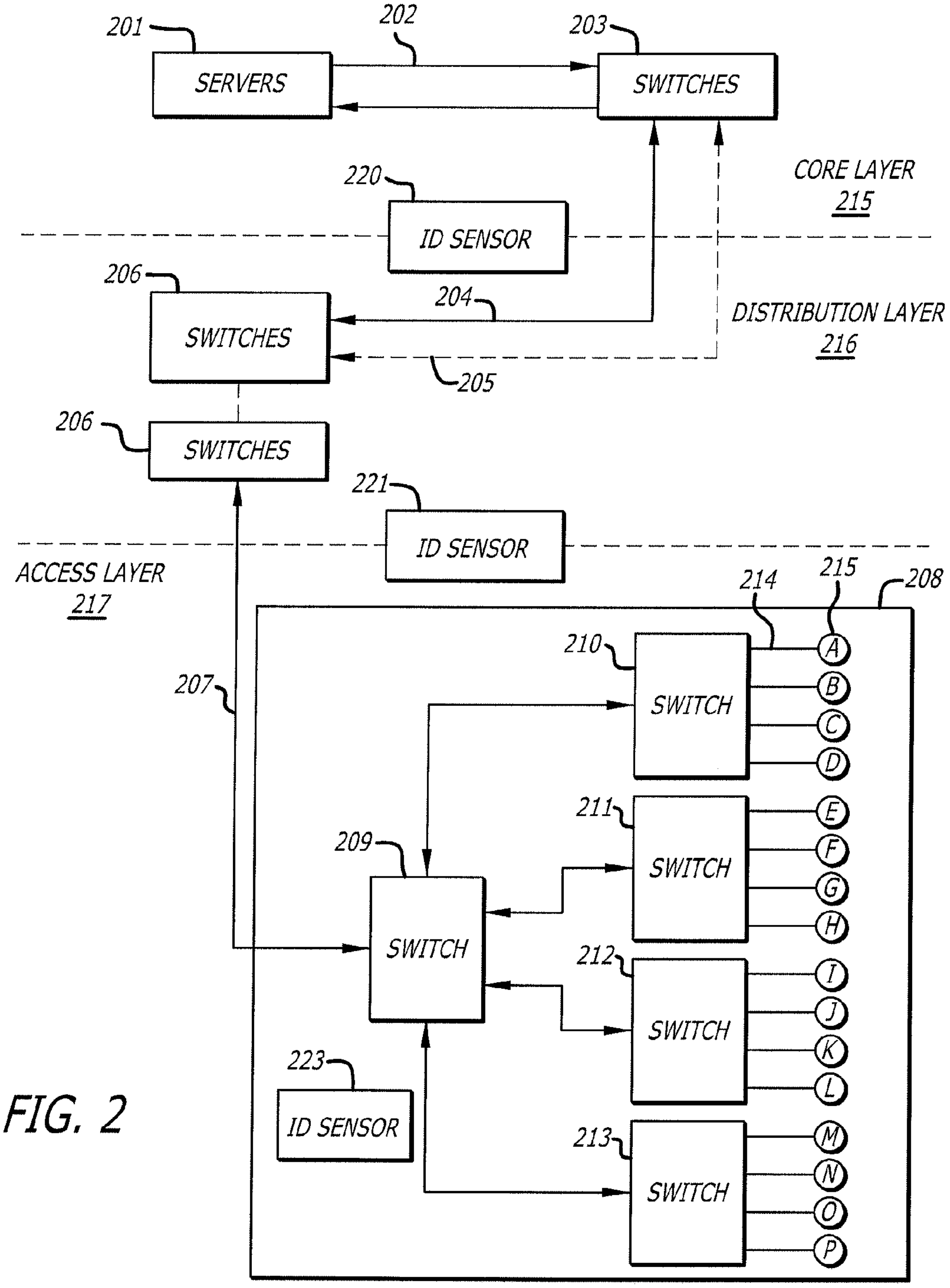
FIG. 2 is a block diagram of an alternate embodiment of a gaming network that may be used with the system.

Another embodiment of a network that may be used in the system is illustrated in FIG. 2. A core layer 215 includes one or more servers 201 that are coupled via a communication path 202 to one or more switches 203. In one embodiment, the servers and switches of the core layer 215 are located within the gaming establishment premises in a secure administrative area. The servers 201 may, but are not required to be, game servers. The communication path 202 may be hardwire (e.g., copper), optical fibers, wireless, microwave, or any other suitable communication path that may be protected from attack. In one embodiment, the switches 203 are L2/L3 switches. However, one of ordinary skill in the art will appreciate that other types of switches may be used without departing from the scope or spirit of the claimed system.

A distribution layer 216 communicates with the core layer 215 via high bandwidth communications links 204. These links may be copper, fiber, or any other suitable link. If desired, redundant links 205 may be built into the system to provide more failsafe operation. The communications links couple the core layer switches 203 to the distribution layer switches 206. These may be one or more switches, such as L2 switches, for example.

The distribution layer 216 communicates with an access layer 217 via a high capacity communication link 207. The link 207 may be wire, fiber, wireless, or any other suitable communication link. In the embodiment of FIG. 2, the communication link 207 is coupled to a gaming carousel 208 that comprises a plurality of gaming machines (e.g., 16 gaming machines 215A-215P). A managed switch 209 is coupled to the link 207 to provide an interface switch to a plurality of other managed switches 210 through 213. In the embodiment illustrated, each of the managed switches 210-213 manages four game machines 215(*x*). It is understood that the types of switches may be changed without departing from the scope of the claimed system. Further, switches with more or fewer ports may be substituted and more or fewer tiers of switches in the access layer may be used, as well, without departing from the scope or spirit of the claimed system. In another embodiment, each game machine has its own managed switch.

In one embodiment of the gaming network, the network uses TCP/IP sessions between the gaming machines 215 and the servers 201. The TCP/IP sessions are used to exchange private information concerning game operations, game performance, network management, patron information, revised game code, accounting information, configuration and download, and other sensitive information. In one embodiment, sessions may be a single message and acknowledgement, or the sessions may be an extended interactive, multiple transaction session. Other instantiations may include UDP/IP, token ring, MQ, etc.

The example network is described in co-pending U.S. patent application Ser. No. 11/220,781, filed Sep. 7, 2005, entitled Gaming Network and is incorporated herein by reference in its entirety. Any of the servers of FIGS. 1 and 2 could serve as the Configuration Server Point for use in the system.

Figure 3:
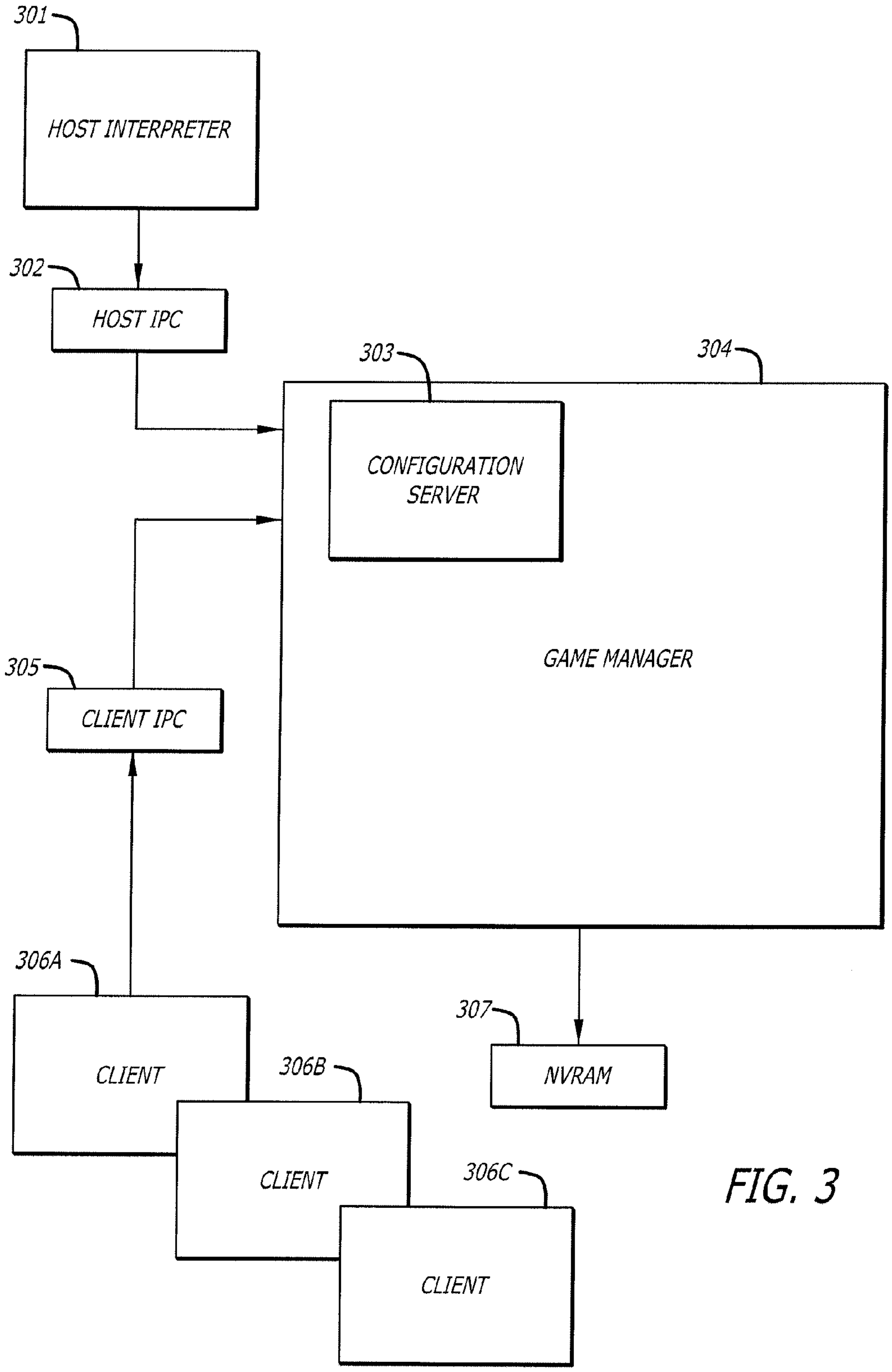
FIG. 3 is a block diagram of an embodiment of the system.

FIG. 3 is a block diagram of an embodiment of a configuration management architecture that may be used in an EGM with the system. The architecture illustrates software functions within an EGM in one embodiment. A configuration server 303 is part of the game manager 304. An IPC connection 302 is made to a host interpreter 301. In one embodiment, the host interpreter interprets for the so-called Best of Breed ("BOB") protocol or G2S protocol. One or more clients 306A-306C have an IPC connection 305 to the configuration server 303. The configuration server has access to local NVRAM 307 via the game manager 304.

In one embodiment, the configuration server 303 acts as a central point of configuration management. The server 303 does not necessarily have specific knowledge of any specific configuration options. Rather, the server handles each configuration option dynamically as it is registered and used. It is the responsibility of the configuration client to register for a configuration and respond to a configuration change.

The client object's function is to provide a useful interface to the configuration service. The methods given are not direct IPC calls, but instead tools that use IPC calls to communicate with the configuration service. The majority of these methods accept vectors of configuration objects to reduce calls and simplify the interface, as it is anticipated that most configuration clients will have multiple options to manage. Even though configuration objects may be created at any time, it is recommended that all configuration objects be registered before a "Game Complete" event. This will allow host interpreters to have a consistent point of completeness, and provide a more consistent interface with the given host system.

The system may also include secure network technology to assure that only authorized systems and users may inspect or alter an EGM's configuration options. The use of PKI and SHA1 are applied to authenticate and validate configuration network messages.

The system may also include technology in the CSP network server and in the EGM to exchange an EGM's configurable options and constraints on possible settings for those options. The system uses a point-to-point protocol between the CSP and the EGM, where the CSP can request a full set or a subset of options from the EGM. The EGM uses the point-to-point protocol to respond to the request, providing either a full set or the appropriate subset of options and constraints. Each option is accompanied with constraints: either a range of valid settings or a list of valid settings—one of which can be active at any given time.

The gaming system may also send the modified configuration options from the CSP to the EGM, where the EGM will validate the new option settings. If the option settings are within constraints and match the EGM's capabilities, then the EGM will accept the option settings. Otherwise, the EGM will reject the option settings and notify the CSP of the rejection.

The gaming system may also specify the application conditions that EGM will use to apply the new option settings. The application conditions include optional time windows with date and times for the start and end times. There are application conditions for disabling the game before the changes may be applied. Alternatively, the game does not need to be disabled before the changes are applied. There are also application conditions that include automatic application, manual operator interaction, or explicit authorization from the CSP. There is also a parameter for what action to take after the new option settings have been applied—whether to continue EGM operation or to restart the EGM.

Assuming the EGM accepts new option settings and apply conditions from the CSP, the EGM will monitor itself to determine when the correct conditions are available to apply the new option settings. The gaming system monitors and applies the new options only when the proper conditions have been met and then take the appropriate action after the new option settings have been applied.

Furthermore, there are many combinations of selecting subsets of options such as, but not limited to, cabinet and peripheral options, communication options, player tracking options, money handling options, bonus options, progressive jackpot options, game options (there may be game options that affect all games on the EGM), or any combination thereof. There can be options that are defined by theme and affect all of the games of that given theme. There can also be options defined at the paytable level that can affect a specific instantiation of a game theme, paytable, or denomination.

In the various embodiments of the gaming system, the network topology may be altered to accommodate one or more of the following communication schemes. One embodiment is directed to a "Home-run" network where a dedicated communication line is routed from each EGM to the CSP, including, but not limited to, Ethernet network schemes. In another network topology is configured as a multi-drop asynchronous serial network where a common communication line is routed from the CSP to an EGM, then from EGM to EGM. In yet another embodiment, the network topology is a multi-drop synchronous serial network where a common communication line is routed from the CSP to an EGM, then from EGM to EGM.

In one embodiment of the gaming system, the specific constraints for common options can be predefined with defaults. This would reduce the data sent from the EGM to the CSP when the EGM responds to a CSP request for options. If the EGM had option setting constraints outside of the default constraints, the EGM would then provide explicit constraints for the option, which would be used to override the default constraints.

In another embodiment, the gaming system also provides for the use of templates that represent a configuration state of an EGM. Instead of remotely setting or changing individual constraint or option, the operator can simply download the configuration template and change all options, constraints, and configurations at once. This can be used in connection with a plurality of EGMs that are either identical or are able to accept identical configuration templates. In one embodiment, the configuration template can be communicated to one or more EGMs as part of a background download. In another embodiment, the configuration template can be communicated to one or more EGMs as part of a multicast.

In yet another embodiment, an EGM can be configured remotely either by selection of individual options or by use of a template. Once an EGM has been configured, a copy of the configuration of the EGM may then be used to configure other EGMs, such as in a bank of similar EGMs.

Once a machine has been configured, the host system may query the machine for its configuration. The machine then responds with its option configuration. This allows for changes to be detected and allow for current configuration information in the host system. In one embodiment, the gaming machine provides data about the option type as well as the configuration setting to the host system. This meta-data makes it easier for the host system to present the data in an appropriate manner to a user for making configuration changes. For example, if the machine returns a configuration option related to volume, the fact that the type is volume may trigger the host system to display that option with a slider bar instead of as a text box.

In order to allow easier operability for a user or administrator, the gaming system uses a naming convention for configuration options so that plain English names can be used to facilitate ease of operation for an administrator when implementing a particular configuration. For example, there may be a number of volume options that can be configured using the gaming system. Labelling each of these options "volume" would limit the ability of a user to distinguish the particular volume option that is desired to configure. Accordingly, the volume options may be labelled as jackpot volume, button volume, or the like. As those skilled in the art will appreciate, the examples are merely exemplary and are not intended to be limiting. In the embodiment, the components are part of a configuration option object that may be provided to an EGM. Within the development environment, an Option can be viewed at any time as a C++ Object, or as a XML text buffer. The configuration Object will usually be handled within the context of a standard template library vector. Configuration Hosts and the configuration manager will view configuration options in their whole form, while configuration clients will typically only deal with the configuration options by their name and value.

According to one embodiment, an object may be created from a file:

CreateFromFile (vector<ConfigurationOption>& Options, char*filename);

This fills the vector Options with all of the Options defined by filename. It also automatically appends the path information as necessary to ensure that each configuration option has a unique name. Alternatively, the Option can be constructed at run time, by declaring an Option and filling each parameter. The operator is responsible for ensuring that configuration option names are unique.

Multiple modules may have configuration options that have the same short name (e.g. volume). A game may have several "Volumes," and the operating system may have its own volume. To manage this problem, a simple name to value pair is not sufficient because the management server needs to be able to distinguish between the different volumes. In order to distinguish between these different volumes, each configuration option name will include the path of the configuration file from which it was created. This reduces the restriction on option names to be unique per configuration file, but now allows multiple "volumes" across the system. This configuration path name may need to be overridden in some specific cases, in which case an IPC call will be supported to do so if and when it is needed. With the path as part of the name, the configuration options when presented to in a GUI can be displayed as "Volume" but in the background can now be managed as "cfg/OSSound/Volume" and "game1/theme/volume", thereby keeping them separate and accurate.

In one embodiment, every configuration object is responsible for defining rules that will prevent illegal configurations. This is important because the possibility of incomplete configurations needs to be avoided, as recovery from such situations may not always be possible due to one time configurations, interdependencies, and the like. Changes may occur singularly or as a whole. Each configuration request will be treated as a single transaction regardless of the size or number of options that change. All rules will be re-evaluated before changes are implemented. Registered clients will receive their option changes at the same time to avoid chicken/egg situations. Configuration clients will have their handlers called in the order that the client registered with the configuration service.

The components of a configuration option object include, but are not limited to, category, name, value, type, minimum, maximum, allowed values, allowed value rules, control type, rules, ReadOnly, OneTimeSettable, IsSet, ReadOnlyWithCredits, Visible, RestrictToAllowedValues, UniquePerMachine, CommaDelimitedList, and Enabled. As can be seen from a review of these components, some may be optional depending on the configuration option. The fields are defined as follows:

The category field is the name of the category in which the object resides.

The name field represents the name of the option.

The value field represents the value of the option, and a casino operator or gaming manufacturer defines the "default" value.

The type field represents the type of the option value such as, but not limited to, double, signed long, string, and Boolean.

The minimum field is an optional field that represents the minimum value of the value field (e.g. minimum volume).

The maximum field is an optional field that represents the maximum value of the value field (e.g. maximum volume).

The allowed values field is also an optional field that presents the range of values that are allowable for the value field.

The allowed value rules field is another optional field that includes a rule that checks if each allowed value is present.

The control type field represents the type of control object to display in GUI to the operator.

The rules field represents the expressions that must resolve to true or non-zero length string for the value field to be considered valid.

The ReadOnly field is a Boolean value that represents whether an option is modifiable. It is preferable if the ReadOnly flag be set once to prevent confusion or conflicts when copying one machines configuration to another.

The OneTimeSettable field is a Boolean value that represents if this option can only be set once per RAM clear.

The IsSet field is a Boolean value that represents if this option has been set at least once since RAM clear.

The ReadOnlyWithCredits field represents an option that can only be modified while there are no credits on the EGM.

The Visible field is a Boolean value representing if this option can/will be displayed to the operator.

The RestrictToAllowedValues is a Boolean value that signifies that the Value must be on the allowed value list. When this flag is not set, Allowed Values are used more as "suggested" values. This option should not be used with the Control Type Combo Box.

The UniquePerMachine field is a flag representing that the option is part of the identity of a gaming machine. Accordingly, this value should not be copied to another machine because no two machines should have the same value.

The CommaDelimitedList is a flag that signifies if this option is intended to be a list of values. Comma delimited lists are intended to have the format "(value)," "(value2)," "(value3)."

The Enabled field is a flag that signifies whether the option is "Enabled." "Enabled" means that a change in the option can have an effect. A "Disabled" flag means that this option value is ignored. For example, there is no printer limit in Iowa so the Enabled field would be flagged as "Disabled." If the printer limit is given a value, the value will have no effect on the operation of the machine. If Enabled is not present in the definition of an option, it is assumed to be true. The Enabled field's primary purpose is for the use in Rules. A rule may check the enabled state of itself, and either require that the value is some fixed number, or allow any value, since it has no effect for example. Rules may also check the enabled state of other rules. For the Iowa example, the tax limit may normally check to ensure that it is greater than printer limit, if the printer limit is enabled, otherwise, ignore the rule. The same rule would then work for jurisdictions that have a printer limit, and for jurisdictions that do not have a printer limit.

The various fields may be single line edit boxes (i.e., text box that accepts a single line of text), a multi-line edit box, a Slider (i.e., a dragable slider bar), a Checkbox (i.e., box may be checked or unchecked that is used for Boolean options), CheckBoxArray (i.e., used for comma delimited lists with allowed value sets. Each selected checkbox will add a comma delimited string to the Value), a ListBox (i.e., a box displaying a list of allowed values to be chosen from by Operator), a ComboBox (i.e., a box displaying an allowed values list and allows the Operator to enter a custom single line of text), or a RadioButton field (i.e., Allowed Values are represented as Radio Button options, and the Operator will be allowed to select one button). As those skilled in the art will appreciate, other entry fields may be used input or select values or options for one or more fields.

According to one embodiment, configuration rules are intended to allow the configuration manager and the host system to pre-check all configuration requests and make accurate predictions on if a configuration is possible and valid. The host system will be able to also use the rules system to provide immediate feedback to a GUI user if the configuration they are creating is valid. The Rules system is not the last stand against illegal or bad configurations, but it should cover the majority of cases. Additional coded checks within the gaming machine should be made to ensure that an error in a configuration rule does not allow illegal configuration. For every rule, the final result must be true, or the option will be considered invalid. Multiple rules can be applied to any Option. It may be advantageous to have multiple rules than a single large rule consisting of a series of ands. This allows error reporting to be more specific. Rules will be similar to c style expressions, and can reference other options by their name. To refer to another option by name, the [OptionName: defaultValue] operator may be used. The OptionName is the name of the option being referred to, the defaultValue is the value that is returned if OptionName is not found.

Figure 4:
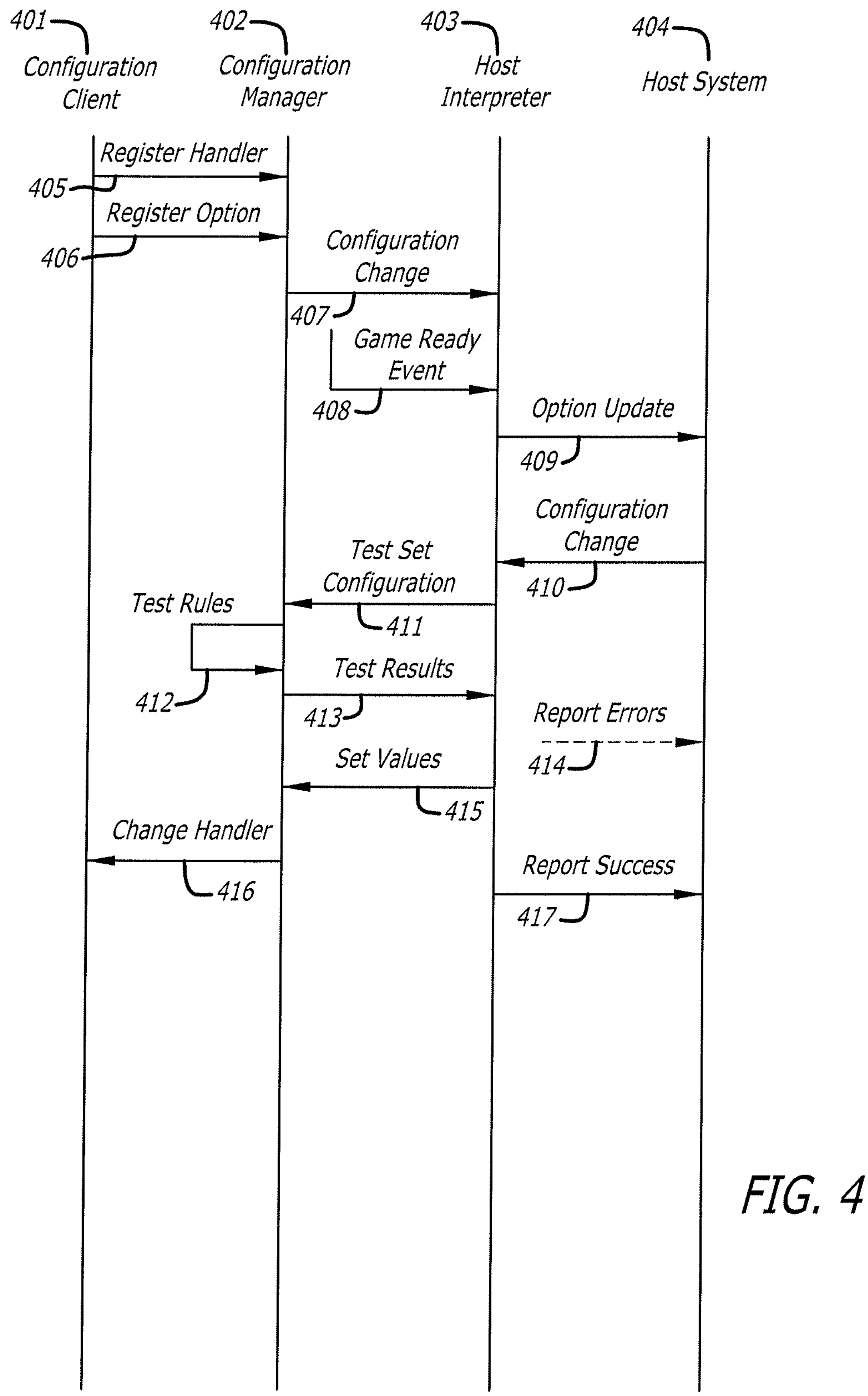
FIG. 4 is a sequence diagram illustrating one embodiment of the operation of the system.

FIG. 4 is a sequence diagram illustrating the operation of one embodiment of the system. The diagram shows the communication between the configuration client 401, configuration manager 402, host interpreter 403 and host system 404. The configuration client 401 registers its handler 405 and option 406 with configuration manager 402. Configuration manager 402 sends the configuration change 407 and game ready event 408 to the host interpreter 403. The host interpreter 403 sends an option update 409 to the host system 404.

The host system 404 returns a configuration change 410 to the host interpreter 403, which sends a test set configuration 411 to the configuration manager 402. The configuration manager 402 tests the rules 412 and returns the test results 413 to the host interpreter 403. If the test fails, the host interpreter 403 reports errors 414 to the host system 404. Otherwise, the host interpreter 403 sends set values 415 to the configuration manager 402 who sends a change handler 416 to configuration client 401. The host interpreter 403 reports success 417 to the host system 404.

Figure 5:
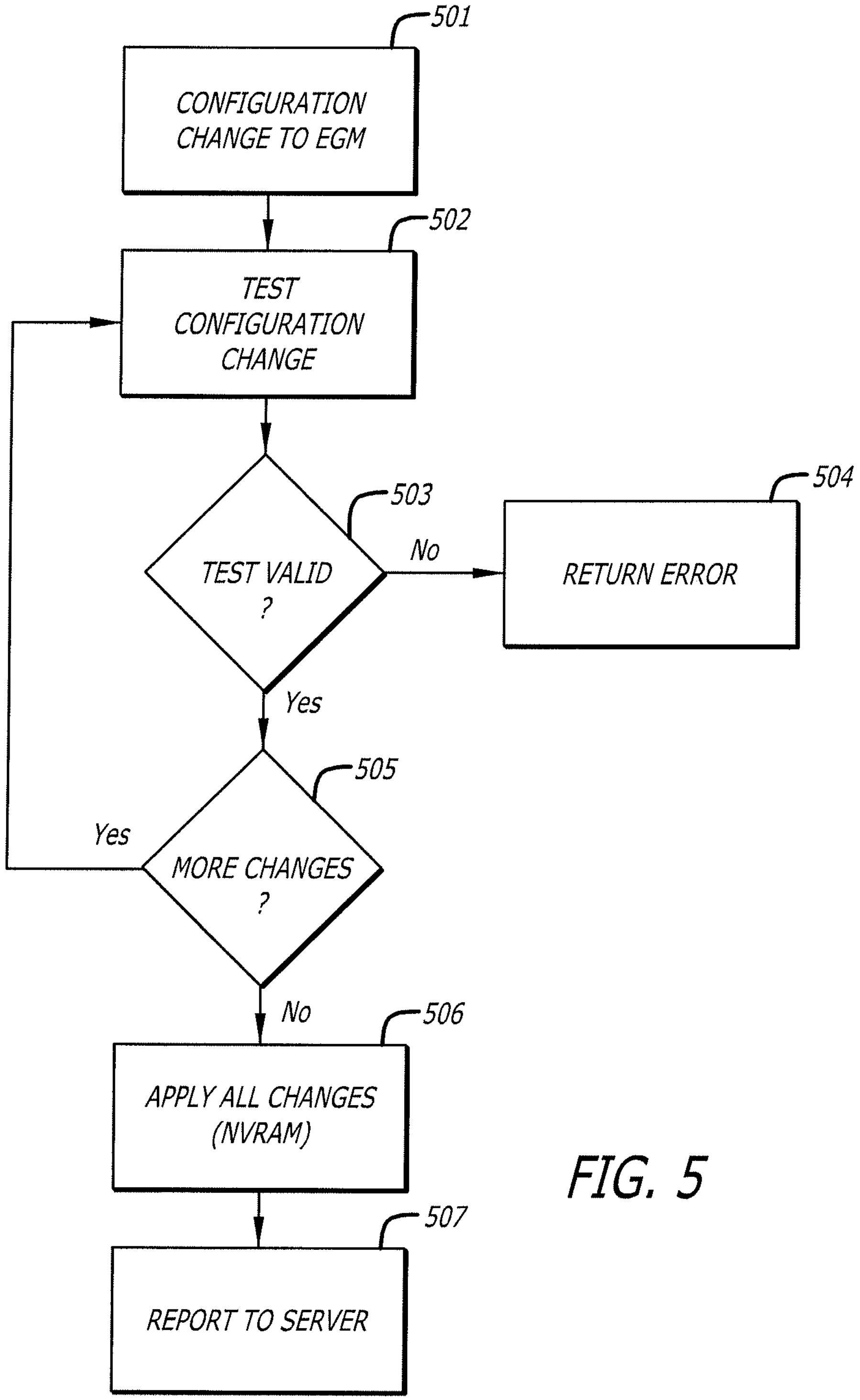
FIG. 5 is a flow diagram of an embodiment of the system.

The gaming system does not change the configuration at an EGM unless the new configuration has been tested and validated. Referring to FIG. 5, at step 501*a* configuration change is provided to an EGM. At step 502 the EGM tests the configuration change for validity. If not valid at step 503, the system returns an error at step 504. Otherwise the system checks whether there are more changes at step 505. If so, the system returns to step 502 to validate those changes. Otherwise the system applies all of the changes at once at step 506. In one embodiment this means writing the changes to a block in an NVRAM at the EGM and then applying the changes to the EGM by applying the configuration parameters to the appropriate controllers in the EGM. At step 507 the system reports success to the server.

Because the configuration of the EGM is stored in NVRAM, the EGMs can recover from power failures more easily than before. Upon power up, all the configuration parameters are still present in the NVRAM and available for configuring the machine. In addition, the EGM can periodically broadcast its configuration state to a server as necessary.

In one embodiment, the system permits configuration changes from a handheld device that may be used by authorized personnel near the EGM. This may be particularly useful for controlling the audio volume of EGMs on a casino floor. In some cases, a standard volume level may sound louder in a particular environment or in a particular machine. The system allows a user to be adjacent an EGM and control some of the environmental parameters on the spot without needing the open the machine or shut it down. Some environmental parameters may have the ability to be changed during game play so that a player need not interrupt play on the machine while such updates are taking place.

The system also supports the downloading and storing of multiple configuration templates that are each tested for validity. In this embodiment, the server need only communicate a command to the EGM to select a previously validated, but locally stored, configuration template. In some cases, it may be desirable to having an automatically timed switch from one configuration to another based on time of day or day of week.

In one embodiment of the system, a configuration template is established that represents a tournament mode of the EGM. If it is desired to initiate tournament play on one or more EGMs.

In one embodiment, the gaming system has the ability to obtain configuration states of an EGM and recreate field issues at a similar EGM that is located off floor for example. The issues can then be corrected and the appropriate configuration options can be provided remotely to the EGM that was originally having issues and correct it without needing to manually open the EGM. This replaces the prior art technique of taking an EGM out of play while converting it to tournament mode.

Certain configuration options have to do with regulatory requirements. The system provides for those options to be visible but not reconfigurable. This permits the administration and review of EGMs for jurisdictional compliance without requiring manual inspection of the EGM.

One of the configuration options that can be controlled by the system is the denomination of the EGM. When coordinated with yield management algorithms, the system allows the denomination of an EGM to be easily increased or decreased as appropriate to maximize or increase yield based on real-time conditions.

Many options that can be configured by the system includes, but is not limited to, the following examples. For example, user feed back sounds, game play sounds and attract mode sounds may be configured at the network terminal. Additionally, user feedback definitions may also be configured at the network terminal. The user feedback definitions include, but are not limited to, play buttons, operator buttons, bill in sounds, coin in sounds, jackpot sounds, instructional vocals. Game play definitions such as, but not limited to, reel spin duration, win roll up speed, and bonus features may also be configured at the network terminal. Category limits such as, but not limited to, credit limits, IRS limits, jackpot limits, bill limits, and bill reject limits are also configurable at the network terminal. Voucher data such as, but not limited to, voucher location and voucher address may also be configured at the network terminal. Additionally, identification information such as asset number and serial number of an EGM may be established at the network terminal. Furthermore, the denomination for game play may also be configured at the network terminal.

Figure 6:
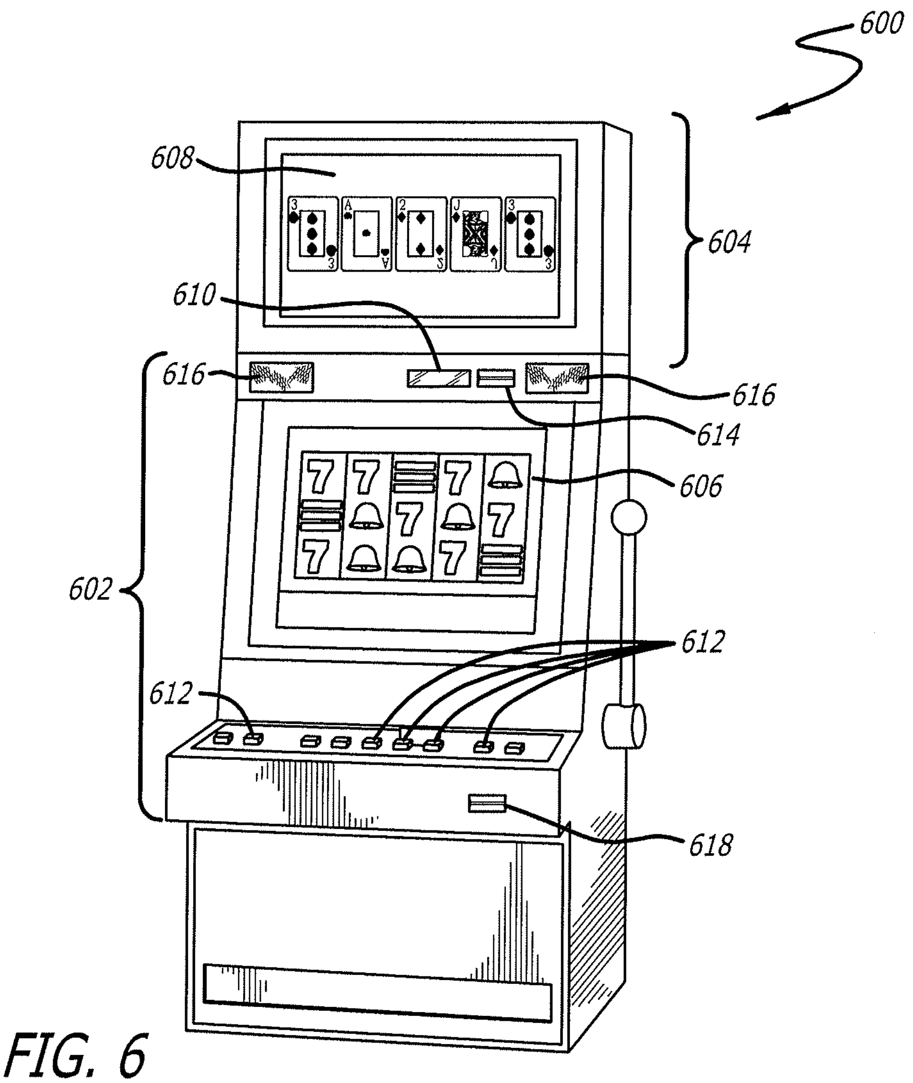
FIG. 6 is a perspective view of one embodiment of an electronic gaming machine.

FIG. 6 illustrates one embodiment of an EGM 600. The main cabinet 602 of the gaming machine 600 is a self-standing unit that is generally rectangular in shape. In another embodiment, the main cabinet is a slant-top gaming cabinet. Alternatively, in other embodiments, the gaming cabinet 602 may be any shaped cabinet known or developed in the art that may include a top box. Additionally, the cabinet may be manufactured with reinforced steel or other rigid materials that are resistant to tampering and vandalism. Optionally, in an alternate embodiment, the gaming machine is a cinema-style gaming machine (not shown) having a widescreen display, as disclosed in U.S. application Ser. No. 11/225,827, entitled "Ergonomic Gaming Cabinet," filed on Sep. 12, 2005, which is hereby incorporated herein by reference.

As shown in FIG. 6, the gaming machine 600 includes a top box 604 positioned on top of the main cabinet 602. According to one embodiment, the top box 604 is a separate and distinct component that is affixed to the main cabinet 602. In another embodiment, the top box 604 is an area that is partitioned from the main cabinet 602. Alternatively, the top box 604 and the main cabinet 602 may be contiguous areas with the outward appearance of two distinct components. In another embodiment, the top box 604 also includes a display glass (not shown) that includes the name of the game, artwork, game instructions, pay table, or other information relating to one or more games presented on the gaming machine 600.

The EGM 600 also includes a primary display 606 positioned within the main cabinet 602. A base or primary game is generally presented on the primary display 606. The base game may be a slots-style game (e.g., mechanical, video, or a combination of mechanical and video), video keno, video poker, video blackjack, video roulette, Class II bingo, central determination games, games of skill, games of chance involving some player skill, or any combination thereof.

In another embodiment, the top box 604 includes a secondary display 608. The secondary display 608 may be used to present game information (e.g., name of the game, animation, one or more pay tables, game information, one or more help menus, progressive jackpot or game information, tournament game information, or any combination thereof) or non-game related information (e.g., news, advertisements, messages, promotions, or any combination thereof). In another embodiment, the secondary display 608 presents a secondary game such as, but not limited to, a bonus game, a progressive game, or another game of chance such as, but not limited to, video slots, video keno, video poker, video blackjack, video roulette, Class II bingo, games of skill, games of chance involving some player skill, or any combination thereof.

In an alternative embodiment, the secondary display 608 presents game-related information such as, but not limited to, a pay table or one or more game options to the player. Alternately, the secondary display 608 presents non-game related information such as, but not limited to, advertisements, news, information on sports betting and betting options for those sporting events, requests for drinks or food, concierge services, or promotional information (e.g., information relating to player's club).

Optionally, the gaming machine 600 also includes a third display 610 positioned below the primary display 606. As those skilled in the art will appreciate, the third display may be positioned below the main display, adjacent to the primary or secondary display, on the player interface, or any location on the gaming machine within the line-of-sight of a player. According to one embodiment, the third display 610 is a graphical interface, which is the subject of U.S. patent application Ser. No. 10/943,771, filed Sep. 16, 2004, which is hereby incorporated herein by reference.

The graphical interface includes a web content capable display screen and an embedded processor. Preferably, the web content capable display screen presents web information to a user via the display screen. The embedded processor preferably utilizes an internal operating system and communicates with the gaming processor of the gaming machine. Preferably, the embedded processor reads incoming data, translates the data into a web protocol (web authoring language), if necessary, and maps the data to the web content capable display screen. In this manner, the web content capable display screen increases user excitement by providing a richer gaming experience. Furthermore, the display allows the player to play a secondary game, input information, make selections, receive promotional information or other types of information including, but not limited to, notification that the player has won a system award, is entered into a tournament game or other bonus game. Additionally, the player is able to configure the attributes of interchanging display content via the graphical interface. In another embodiment, the content of the graphical interface may be presented on a portion of the main display 12 or as a pop-up window on the main display.

In one embodiment, the primary, secondary, and tertiary displays 606, 608, 610 are flat panel displays including by way of example only, and not by way of limitation, liquid crystal, plasma, electroluminescent, vacuum fluorescent, field emission, LCOS (liquid crystal on silicon), and SXRD (Silicon Xtal Reflective display), Laser, or any other type of panel display known or developed in the art. These flat panel displays may use panel technologies to provide digital quality images including by way of example only, and not by way of limitation, EDTV, HDTV, or DLP (Digital Light Processing). In another embodiment, the flat panel displays are widescreen displays that are mounted in the gaming cabinet in a portrait or landscape orientation. In other embodiments, the displays 606, 608, 610 are cathode ray tube monitors or projection monitor displays.

In one embodiment, the main display 606 includes a touch screen or a touch glass technology that allows the player to input their number selection by touching a particular portion of the screen displaying a particular number. Additionally, as shown in FIG. 6, the gaming machine 600 includes a plurality of player-activated buttons 612 used for various functions such as, but not limited to, selecting a wager denomination, selecting a number of games to be played, selecting the wager amount per game, initiating a game, or cashing out money from the gaming machine 600. In various embodiments, the player-activated buttons 612 include, but are not limited to, mechanical buttons, electromechanical buttons, touch screen buttons, or soft key buttons. According to one embodiment, the buttons 612 are backlit to indicate whether the button is active.

In another embodiment, the player-activated button is a universal button module that provides a dynamic button system adaptable for use with various games, as disclosed in U.S. application Ser. No. 11/106,212, entitled “Universal Button Module”, filed Apr. 14, 2005 and U.S. application Ser. No. 11/223,364, entitled “Universal Button Module”, filed Sep. 9, 2005, which are both hereby incorporated herein by reference. In other embodiments, other input devices, such as but not limited to, touch pad, track ball, mouse, switches, or toggle switches, are included with the gaming machine to also accept player input.

In yet another embodiment, a cellular phone or other input device (e.g., PDA), separate and apart, from the gaming machine may also be used to input various player choices and information to enhance the player’s interactive experience with the gaming machine. In this embodiment, the gaming machine 600 includes an IR sensor, RF sensor, BLUETOOTH receiver, or other means for receiving input from a cellular phone or other wireless input devices. Furthermore, inputting information via these devices provides an added level of security as any key presses may be hidden from view. In yet another embodiment, a player may call or send a text message or a short message service (SMS) to the gaming machine.

As shown in FIG. 6, the gaming machine 600 includes a player tracking system. The player tracking system allows a casino to monitor the gaming activities of various players. Additionally, the player tracking system is able to store data relating to a player’s gaming habits. That is, a player can accrue player points that depend upon the amount and frequency of their wagers. Casinos can use these player points to compensate the loyal patronage of players. For example, casinos may award or “comp” a player free meals, room accommodations, tickets to shows, and invitations to casino events and promotional affairs. In one embodiment, the player’s club level (e.g., Silver, Gold, Platinum), player rating, or total number of player points may qualify a player for a keno bonus round. In another embodiment, the player’s club level adjusts the pay table for a keno game. Accordingly, a higher rated player wins more money for a given outcome as compared to a lower level (or unrated) player.

Typically, the player tracking system is operatively connected to one or more input components on the gaming machine 600. These input components include, but are not limited to, a slot 614 for receiving a player tracking card, a keypad or equivalent, an electronic button receptor, a display, a touch screen, or the like. The player tracking system may also include a database of all qualified players (i.e., those players who have enrolled in a player rating or point accruing program). Generally, the database for the player tracking system is separate from the gaming machines.

The main cabinet 602 of the gaming machine also houses a game management unit (not shown) that includes a CPU, circuitry, and software for receiving signals from the player-activated buttons 612, operating the games, and transmitting signals to the respective game displays 606, 608, 610 and speakers 616.

In various embodiments, game program may be stored in a memory (not shown) comprising a read only memory (ROM), volatile or non-volatile random access memory (RAM), a hard drive or flash memory device or any of several alternative types of single or multiple memory devices or structures. Optionally, the gaming machines 600 includes one or more data repositories for storing data. Examples of information stored by the gaming machines 600 include, but are not limited to, accounting data, maintenance history information, short and/or long-term play data, real-time play data, sound data, video data, or animation data.

As shown in FIG. 6, the gaming machine 600 includes a ticket reader/ticket printer slot 618 that is associated with a cashless gaming system (not shown). According to one embodiment, the slot 618 is used for the ticket reader and ticket printer. Accordingly, the same slot 618 may be used to insert and/or issue a ticket. However, in alternate embodiments, separate slots (not shown) may be provided for the ticket acceptor and the ticket printer. In one embodiment, the ticket reader (not shown) of the cashless gaming system is capable of accepting previously printed vouchers, paper currency, promotional coupons, or the like. The ticket printer (not shown) of the cashless gaming system generates vouchers having printed information that includes, but is not limited to, the value of the voucher (i.e., cash-out amount) and a barcode that identifies the voucher.

In another embodiment, the gaming machine 600 includes an internet connection or other known network connections to link one or more gaming machines together. According to one embodiment, the internet connection is used for web browsing, prize redemption, or access to other gaming or non-gaming information. Additionally, with the various gaming machines in communication with one another (or a system host), the gaming machine 600 may participate in a gaming tournament. In one embodiment, the gaming tournament is a competitive gaming tournament having one or more winners. Alternatively, the gaming tournament is a cooperative gaming tournament where all eligible gaming machines win a particular award.

It should be noted that the term EGM is intended to encompass any type of gaming machine, including hand-held devices used as gaming machines such as cellular based devices (e.g. phones), PDAs, or the like. The EGM can be represented by any network node that can implement a game and is not limited to cabinet based machines. The system has equal applicability to gaming machines implemented as part of video gaming consoles or handheld or other portable devices. In one embodiment, a geo-location device in the handheld or portable gaming device may be used to locate a specific player for regulatory and other purposes. Geo-location techniques that can be used include by way of example, and not by way of limitation, IP address lookup, GPS, cell phone tower location, cell ID, known Wireless Access Point location, Wi-Fi connection used, phone number, physical wire or port on client device, or by middle tier or backend server accessed. In one embodiment, GPS and biometric devices are built within a player's client device, which in one embodiment, comprises a player's own personal computing device, or provided by the casino as an add-on device using USB, Bluetooth, IRDA, serial or other interface to the hardware to enable jurisdictionally compliant gaming, ensuring the location of play and the identity of the player. In another embodiment, the casino provides an entire personal computing device with these devices built in, such as a tablet type computing device, PDA, cell phone or other type of computing device capable of playing system games.

One of ordinary skill in the art will appreciate that not all EGMs have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A system for validating assignments, the system comprising:

a configuration and validation system for establishing one or more configuration assignments for one or more networked gaming machines; and a plurality of electronic gaming machines in communication with the configuration and validation system, each of the electronic gaming machines being configurable for one or more selectable configuration options; and a network terminal in communication with the configuration and validation system, the network terminal having a user interface to select one or more configurations for one or more electronic gaming machines and a processor for executing an algorithm for validating one or more assignments intended for one or more electronic gaming machines;

wherein the network terminal presents a potential error message on the network terminal when a selected configuration assignment is incompatible on one or more of the electronic gaming machines, wherein the network terminal automatically schedules one or more downloads supplemental to the incompatible selected configuration assignment to resolve the incompatibility, enabling the scheduled configuration assignment to be executable on one or more of the electronic gaming machines;

wherein the network terminal prompts a user to schedule a configuration assignment or automatically schedules a configuration assignment after a scheduled download assignment in response to the network terminal determining that a configuration assignment is not scheduled after the scheduled download assignment.

2. A gaming system, comprising:

a plurality of electronic gaming machines, each of the electronic gaming machines being configurable for one or more selectable configuration options;

a validation system in communication with the plurality of electronic gaming machines; and a network terminal in communication with the plurality of electronic gaming machines via the validation system, the network terminal configured to schedule and validate download assignments and configuration assignments for one or more electronic gaming machines;

wherein the network terminal prompts a user to schedule a configuration assignment or automatically schedules a configuration assignment after a scheduled download assignment in response to the network terminal determining that a configuration assignment is not scheduled after the scheduled download assignment.

3. The system of claim 1, further comprising a second network terminal in communication with the configuration and validation system, the second network terminal having a user interface to select one or more configurations for one or more electronic gaming machines and a processor for executing an algorithm for validating one or more assignments intended for one or more electronic gaming machines.

4. The system of claim 1, wherein the network terminal determines whether a scheduling conflict exists between two or more scheduled assignments.

5. The system of claim 4, wherein the network terminal automatically reschedules one or more of the scheduled assignments.

6. The system of claim 5, wherein the network terminal automatically reschedules the conflicted assignments according to a preset priority.

7. The system of claim 6, wherein an operating system download assignment takes priority over a configuration assignment.

8. The system of claim 1, further comprising a jurisdiction distribution server that contains regulator approved production signed software packages used within a particular jurisdiction.

9. The system of claim 2, further comprising a second network terminal in communication with the configuration and validation system, the second network terminal having a user interface to select one or more configurations for one or more electronic gaming machines and a processor for executing an algorithm for validating one or more assignments intended for one or more electronic gaming machines.

10. The system of claim 2, wherein the network terminal determines whether a scheduling conflict exists between two or more scheduled assignments.

11. The system of claim 10, wherein the network terminal automatically reschedules one or more of the scheduled assignments.

12. The system of claim 11, wherein the network terminal automatically reschedules the conflicted assignments according to a preset priority.

13. The system of claim 12, wherein an operating system download assignment takes priority over a configuration assignment.

14. The system of claim 2, further comprising a jurisdiction distribution server that contains regulator approved production signed software packages used within a particular jurisdiction.

15. A gaming system, comprising:

a plurality of electronic gaming machines, each of the electronic gaming machines being configurable for one or more selectable configuration options;

a validation server in communication with the plurality of electronic gaming machines that schedules and controls the downloading of software packages that correspond to a configuration or download assignment associated with one or more of the of electronic gaming machines;

a network terminal for configuration verification or alteration of one or more configuration or download assignments corresponding to one or more electronic gaming machines;

one or more jurisdiction distribution servers that contain regulator approved production signed software packages used within one or more particular jurisdictions, wherein the one or more jurisdiction distribution servers is in communication with the validation server; and one or more software distribution servers that contain regulator approved production signed software packages used in a particular gaming establishment, wherein the one or more software distribution servers are in communication with the validation server and with one or more of the electronic gaming machines;

wherein the network terminal prompts a user to schedule a configuration assignment or automatically schedules a configuration assignment after a scheduled download assignment in response to the network terminal determining that a configuration assignment is not scheduled after the scheduled download assignment.

16. The system of claim 15, wherein the network terminal determines whether a scheduling conflict exists between two or more scheduled assignments.

* * * * *